United States Patent
Kuribayashi

(10) Patent No.: US 7,280,130 B2
(45) Date of Patent: Oct. 9, 2007

(54) OPTICAL MULTI-BEAM SCANNING DEVICE AND IMAGE FORMING APPARATUS

(75) Inventor: Yasushi Kuribayashi, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 382 days.

(21) Appl. No.: 10/820,750

(22) Filed: Apr. 9, 2004

(65) Prior Publication Data

US 2005/0225627 A1    Oct. 13, 2005

(51) Int. Cl.
  *B41J 15/14*   (2006.01)
  *B41J 27/00*   (2006.01)
  *B41J 2/435*   (2006.01)
  *B41J 2/47*    (2006.01)
  *B41J 2/455*   (2006.01)

(52) U.S. Cl. .............. 347/241; 347/232; 347/233; 347/256; 347/260

(58) Field of Classification Search ........... 347/224, 347/238, 241–244, 232–233, 260, 256
See application file for complete search history.

(56) References Cited

U.S. PATENT DOCUMENTS 6,229,656 B1 *  5/2001  Omura ................. 359/796

2001/0033408 A1 * 10/2001  Shiraishi et al. ......... 359/212

FOREIGN PATENT DOCUMENTS

| JP | 63-81636 A | 4/1988 |
| JP | 5-24421 A | 3/1993 |
| JP | 5-303016 A | 11/1993 |
| JP | 6-349100 A | 12/1994 |
| JP | 11194285 A * | 7/1999 |
| JP | 2003-195209 A | 7/2003 |

* cited by examiner

Primary Examiner—Matthew Luu
Assistant Examiner—Kainoa Wright
(74) Attorney, Agent, or Firm—Foley & Lardner LLP

(57) ABSTRACT

An optical multi-beam scanning device has a plurality of pre-deflection optical units, an optical path synthesizing member and an excessive light processing member. The excessive light processing member processes excessive light emitted from an excessive light emitting surface with is not an incident surface nor an emitting surface of the optical path synthesizing member. The excessive light processing member has a multi-stage taper constitution with a plurality of taper surfaces having different tilt angles.

4 Claims, 8 Drawing Sheets

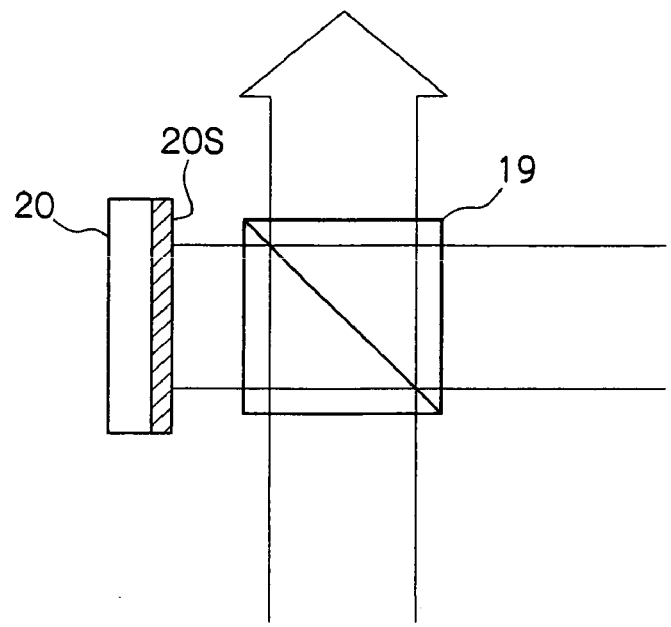
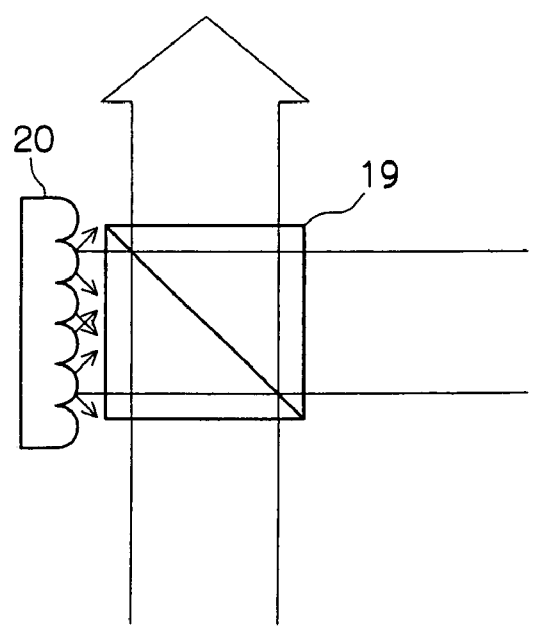

OPTICAL MULTI-BEAM SCANNING DEVICE AND IMAGE FORMING APPARATUS

BACKGROUND OF THE INVENTION

The invention relates to an image forming apparatus such as a copying machine, a printer, and a composite machine which has a copying function and a printing function, and an optical multi-beam scanning device which is mounted on the image forming apparatus. Specifically, the invention relates to the optical multi-beam scanning device and the image forming apparatus for a color mode.

Image forming apparatuses mainly adopt a method in which a number of light beams to be scanned at a time is increased (multi-beam) as speed heightening means of writing optical systems. In writing optical systems of four-tandem (one pass) color composite machines, it becomes mainstream that a polygon mirror, a scanning lens, and the like are shared in order to reduce the cost.

In the case where the adoption of multi-beam is considered, a method of synthesizing laser beams from individual LDs (laser diodes) with one another using a beam splitter, a half mirror and the like so as to lead the synthesized laser beam to a polygon mirror, and a method of leading a plurality of laser beams to a polygon mirror using an LD array for emitting the laser beams to one direction are considered. From a viewpoint of an installation space, the LD array is advantageous, but when a number of scanning light beams increases to 4, 8, . . . , synthesization using the beam splitter should be used at the same time. In the four-tandem (1 pass) color composite machines, light beams (laser beams) should be separated by a mirror so as to go to photosensitive drums for respective color components after deflection. Since separation intervals are too narrow in the method using the LD array, the method using the individual LDs is preferable.

There are a lot of optical multi-beam scanning devices which adopt the method of synthesizing laser beams from the LDs using the beam splitter, the half mirror, and the like so as to lead the synthesized laser beam to the polygon mirror.

Optical parts for switching a ratio of reflection and transmission by a deflecting direction of a beam from the beam splitter, the half mirror and the like or by the thickness of a reflecting layer, are applied to a synthesizing unit for optical paths of the laser beams. Even in this case, a laser beam (excessive light), which moves to a direction (for example, a reflecting direction) other than an intended direction (for example, a transmitting direction), is also present, and this laser beam becomes stray light and it might deteriorate the performance of the apparatus.

A technique relating to an optical pickup is disclosed in Japanese Unexamined Patent Application Publication No. 5-54421. In this publication, a taper portion of 45° is provided on a portion for housing optical parts of the optical pickup, and excessive light emitted from a polarized light beam splitter is reflected by the taper portion (an optical path of the excessive light is folded by 90°) so as to let it go to the outside. There is also described that if the taper portion is painted black, it is more effective.

Such a stray light countermeasure against the application of the optical parts such as the beam splitter and the half mirror can be applied only to the case where rear positions of stray light emitting surfaces of the optical parts have a sufficient space. In the optical multi-beam scanning device which leads a plurality of laser beams from a plurality of LDs to one polygon mirror, since installation positions of the respective optical parts are close to one another, the above method cannot be applied in most cases from the viewpoint of the space.

SUMMARY OF THE INVENTION

It is an object of the present invention to provide an optical multi-beam scanning device which is capable of preventing a bad effect on light sources and other optical parts due to stray light of light beams from an excessive light emitting surface of an optical path synthesizing optical part provided in order to guide a plurality of light beams to one deflecting surface even when a rear position of the excessive light emitting surface does not have a sufficient space, and an image forming apparatus which adopts such an optical multi-beam scanning device.

An optical multi-beam scanning device of the present invention includes: a plurality of light sources; pre-deflection optical units for giving a predetermined property to light beams from the light sources, the pre-deflection optical units corresponding to the light sources, respectively; an optical path synthesizing member for aligning optical paths of the light beams from all or some of the light sources in a horizontal scanning direction after the pre-deflection optical units give the predetermined properties to the light beams or while giving them to the light beams; an excessive light processing member having a multi-stage taper constitution with a plurality of taper surfaces having different tilt angles for reflecting excessive light emitted from an excessive light emitting surface which is not an incident surface nor an emitting surface of the optical path synthesizing member; and a light deflecting device for deflecting the light beams from the pre-deflection optical units corresponding to the light sources to the horizontal scanning direction due to reflection from one surface.

Further, an optical multi-beam scanning device of another aspect if the present invention includes: a plurality of light sources; pre-deflection optical units for giving a predetermined property to light beams from the light sources, the pre-deflection optical units corresponding to the light sources, respectively; an optical path synthesizing member for aligning optical paths of the light beams from all or some of the light sources in a horizontal scanning direction after the pre-deflection optical units give the predetermined properties to the light beams or while giving them to the light beams; an excessive light processing member having an absorbing surface roughly parallel with an excessive light emitting surface for absorbing excessive light emitted from the excessive light emitting surface which is not an incident surface nor an emitting surface of the optical path synthesizing member; and a light deflecting device for deflecting the light beams from the pre-deflection optical units corresponding to the light sources to the horizontal scanning direction due to reflection from one surface.

The absorbing surface of the excessive light processing member is formed by adhering a light absorbing sheet to the absorbing surface, or repeating convexo-concave patterns for reflecting and absorbing the excessive light.

An optical multi-beam scanning device of still another aspect of the present invention includes: a plurality of light sources; pre-deflection optical units for giving a predetermined property to light beams from the light sources, the pre-deflection optical units corresponding to the light sources, respectively; an optical path synthesizing member for aligning optical paths of the light beams from all or some of the light sources in a horizontal scanning direction after the pre-deflection optical units give the predetermined properties to the light beams or while giving them to the light beams; an excessive light processing member having repeated local patterns for dispersing excessive light emitted from an excessive light emitting surface which is not an incident surface nor an emitting surface of the optical path synthesizing member; and a light deflecting device for deflecting the light beams from the pre-deflection optical units corresponding to the light sources to the horizontal scanning direction due to reflection from one surface.

An image forming apparatus of the present invention has an optical multi-beam scanning device having a plurality of light sources, a control unit for controlling light emitting timing of the light sources, and photoreceptors on which latent images are formed based on light beams from the optical multi-beam scanning device. The image forming apparatus adopts the above-mentioned optical multi-beam scanning devices as the optical multi-beam scanning device.

BRIEF DESCRIPTION OF THE DRAWINGS

FIG. 12 is a schematic sectional view illustrating the excessive light processing member according to a fifth embodiment in the horizontal scanning direction;

FIG. 13 is a schematic sectional view illustrating the excessive light processing member according to a sixth embodiment in the horizontal scanning direction;

DETAILED DESCRIPTION OF THE INVENTION

An optical multi-beam scanning device and an image forming apparatus according to preferred embodiments of the present invention are explained below with reference to the drawings.

(A) First Embodiment

Figure 1:
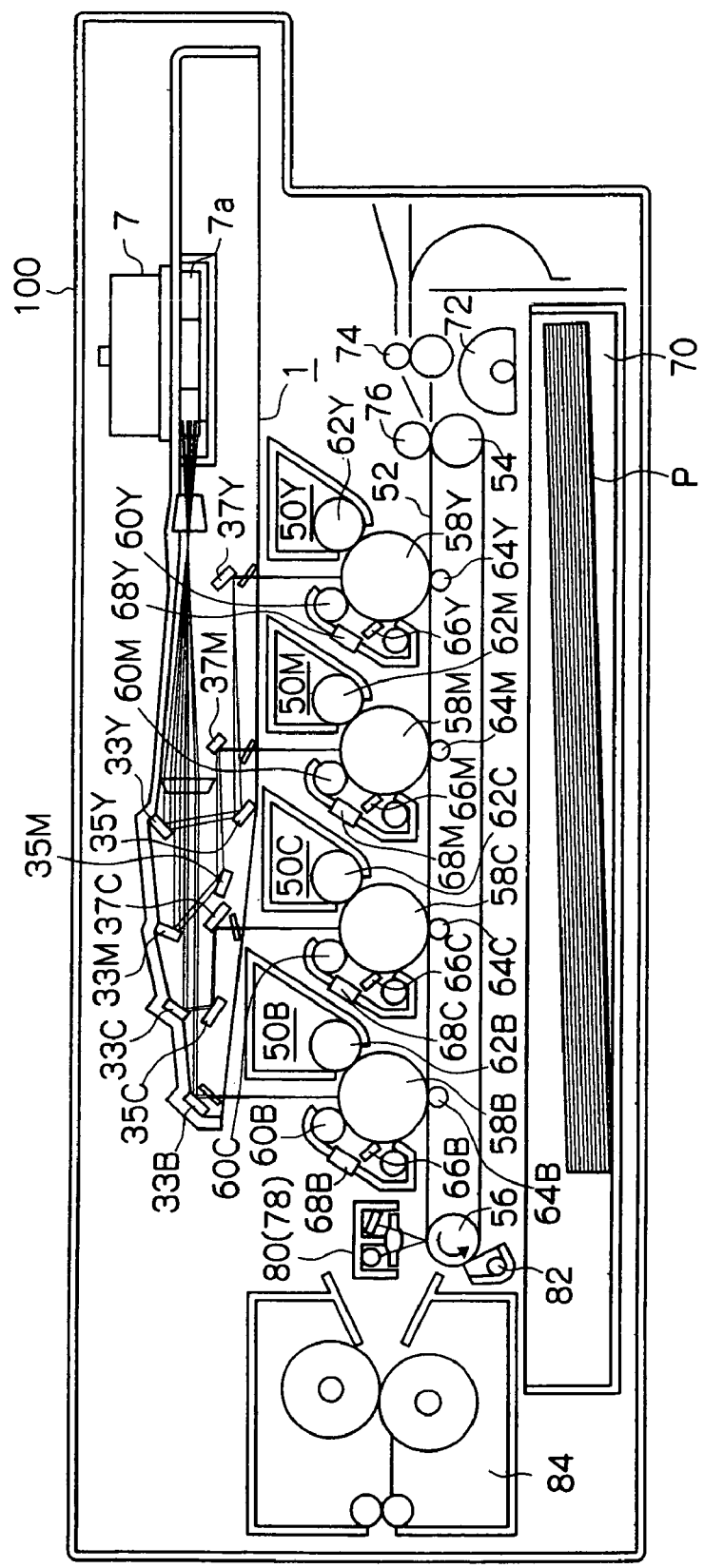
FIG. 1 is a schematic sectional view illustrating a color image forming apparatus according to a first embodiment of the present invention.

FIG. 1 is a diagram illustrating a color image forming apparatus into which the optical multi-beam scanning device according to a first embodiment of the present invention is incorporated. This kind of the color image forming apparatus utilizes four sets of various devices which form four kinds of image data separated into color components of Y (yellow), M (magenta), C (cyan), and B (black) and form images for the respective color components corresponding to Y, M, C and B. For this reason, Y, M, C and B are added to respective reference numerals so that the image data for the respective color components and the devices are discriminated.

As shown in FIG. 1, an image forming apparatus 100 has first to fourth image forming sections 50Y, 50M, 50C and 50B for forming images for color-separated color components.

The image forming sections 50Y, 50M, 50C and 50B are arranged in this order below an optical scanning device 1 correspondingly to positions where laser beams L (Y, M, C and B) are emitted. The laser beams are used for optically scanning image information about the color components using a first folding mirror 33B and third folding mirrors 37Y, 37M and 37C of the optical multi-beam scanning device 1, detailed with reference to FIGS. 2 and 3.

A conveyance belt 52 for conveying a transfer material on which the images formed via the image forming sections 50 (Y, M, C and B) are transferred is arranged below the image forming sections 50 (Y, M, C and B).

The conveyance belt 52 is entrained between a belt driving roller 56 and a tension roller 54 which are rotated to a direction of an arrow by a motor, not shown. The conveyance belt 52 is rotated at a predetermined speed to a direction where the belt driving roller 56 rotates.

The image forming sections 50 (Y, M, C and B) are formed into a cylindrical shape rotatable to a direction of an arrow, and have photosensitive drums 58Y, 58M, 58C and 58B, respectively. Electrostatic latent images corresponding to the images exposed by the optical scanning device 1 are formed on the photosensitive drums.

Charging devices 60 (Y, M, C and B), developing devices 62 (Y, M, C and B), transfer devices 64 (Y, M, C and B), cleaners 66 (Y, M, C and B), and anti static devices 68 (Y, M, C and B) are arranged in this order, respectively around the photosensitive drums 58 (Y, M, C and B) along the direction where the photosensitive drums 58 (Y, M, C and B) rotate. The charging devices 60 (Y, M, C and B) provide predetermined electric potentials to the surfaces of the photosensitive drums 58 (Y, M, C and B). The developing devices 62 (Y, M, C and B) supply toner having colors corresponding to the electrostatic latent images formed on the surfaces of the photosensitive drums 58 (Y, M, C and B) so as to develop the images. The transfer devices 64 (Y, M, C and B) are arranged so as to be opposed to the photosensitive drums 58 (Y, M, C and B) on a rear surface of the conveyance belt 52 with the conveyance belt 52 intervening between the transfer devices and the photosensitive drums. The transfer devices 64 (Y, M, C and B) transfer the toner images on the photosensitive drums 58 (Y, M, C and B) onto a recording medium conveyed by the conveyance belt 52, namely, recording paper P. The cleaners 66 (Y, M, C and B) eliminate residual toner on the photosensitive drums 58 (Y, M, C and B) which is not transferred when the transfer devices 64 (Y, M, C and B) transfer the toner images onto the paper P. The anti static devices 68 (Y, M, C and B) remove residual potentials which remain on the photosensitive drums 58 (Y, M, C and B) after the transfer devices 64 (Y, M, C and B) transfer the toner images.

A paper cassette 70 for housing the recording paper P onto which the images formed by the image forming sections 50 (Y, M, C and B) are transferred is arranged below the conveyance belt 52.

A feeding roller 72 which is primarily formed into a half-moon shape and takes out the paper P housed in the paper cassette 70 one by one starting from the top is arranged on one end of the paper cassette 70 which is close to a tension roller 54.

A register roller 74 for aligning a forward end of one piece of paper P taken out of the cassette 70 with a forward end of the toner image formed on the photosensitive drum 58B of the image forming section 50B (black) is arranged between the feeding roller 72 and the tension roller 54.

An absorption roller 76 is arranged in a position which is in a vicinity of the tension roller 54 between the register roller 74 and the first image forming section 50Y and is substantially opposed to an outer periphery of the conveyance belt 52 corresponding to a position where the tension roller 54 contacts with the conveyance belt 52. The adsorption roller 76 provides a predetermined electrostatic adsorption force to one piece of paper P conveyed at predetermined timing by the register roller 74.

Registration sensors 78 and 80 are arranged on the outer periphery of the conveyance belt 52 which is at one end of the conveyance belt 52, and in a vicinity of the belt driving roller 56 and substantially contacts with the belt driving roller 56 with a predetermined distance in an axial direction of the belt driving roller 56 (since FIG. 1 is a front sectional view, the first sensor 78 positioned on a front side of the sheet in FIG. 1 cannot be seen). The registration sensors 78 and 80 detect positions of images formed on the conveyance belt 52 or positions of images transferred onto the paper P.

A conveyance belt cleaner 82 is arranged in a position which is on the outer periphery of the conveyance belt 52 contacting with the belt driving roller 56 and does not contact with the paper P conveyed by the conveyance belt 52. The conveyance belt cleaner 82 removes toner or slip of paper adhering to the conveyance belt 52.

A fixing device 84 is arranged in a direction where the paper P conveyed by the conveyance belt 52 is separated from the belt driving roller 56 and is further conveyed. The fixing device 84 fixes the toner images transferred onto the paper P to the paper P.

Figure 2:
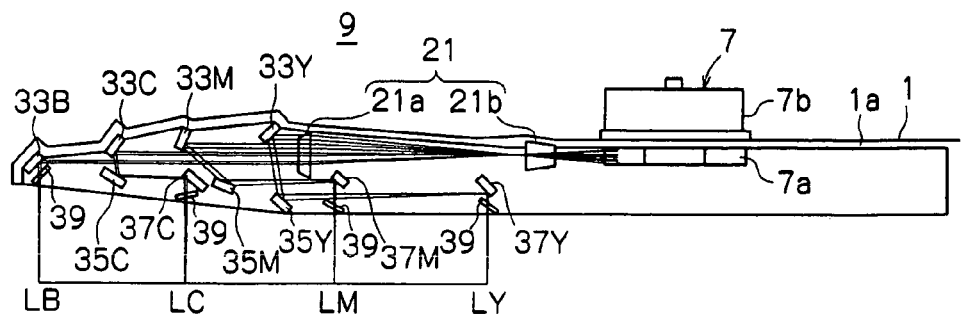
FIG. 2 is a schematic sectional view illustrating components of a post-deflection optical system in an optical multi-beam scanning device according to the first embodiment.
Figure 3:
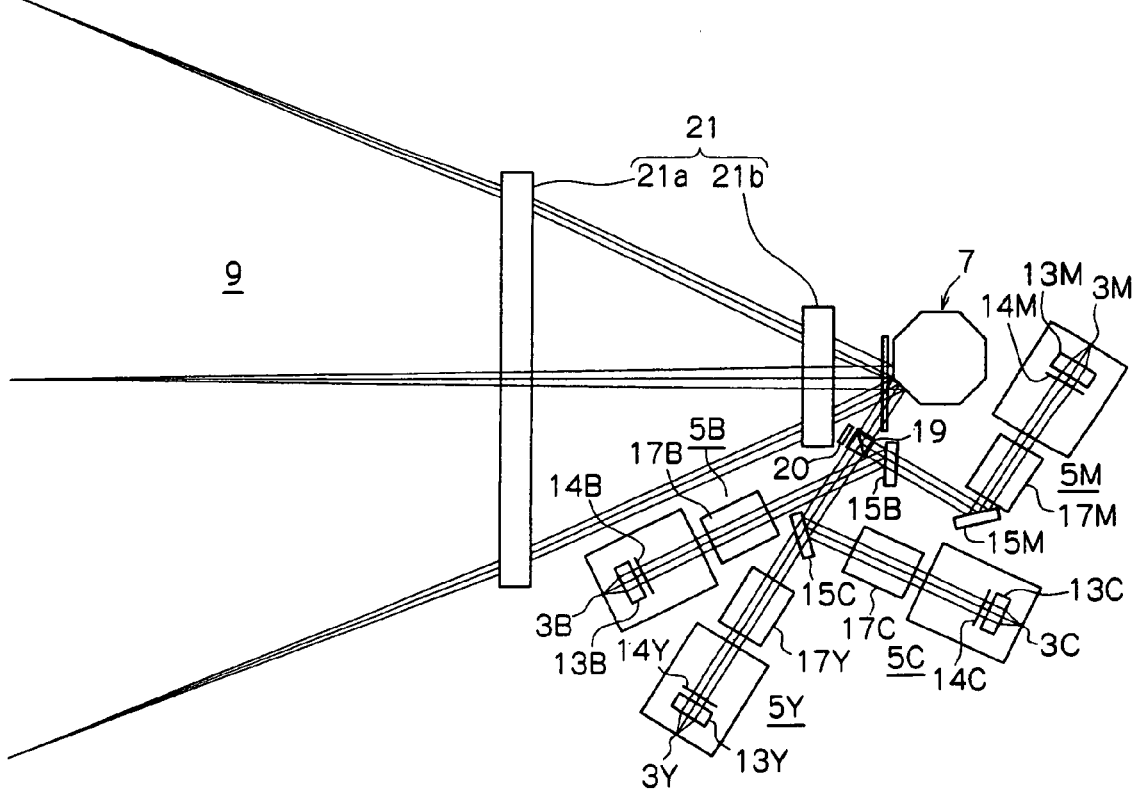
FIG. 3 is a schematic plan view illustrating components of the optical multi-beam scanning device according to the first embodiment.

FIGS. 2 and 3 are diagrams illustrating the optical multi-beam scanning device which is incorporated into the image forming apparatus shown in FIG. 1.

The optical multi-beam scanning device 1 has light sources 3Y, 3M, 3C and 3B, and a light deflecting device 7 as a deflecting unit. The light sources 3Y, 3M, 3C and 3B output light beams to the first to fourth image forming sections 50Y, 50M, 50C and 50B shown in FIG. 1, respectively. The light deflecting device 7 deflects (scans) the light beams (laser beams) emitted from the light sources 3 (Y, M, C and B) towards imaging surfaces arranged on predetermined positions, namely, outer peripheral surfaces of the photosensitive drums 58Y, 58M, 58C and 58B of the first to fourth image forming units 50Y, 50M, 50C and 50B shown in FIG. 1 at a predetermined linear speed. Predilection optical systems 5 (Y, M,C and B) are arranged between the light deflecting device 7 and the light sources 3 (Y, M, C and B). A post-deflection optical system 9 is arranged between the light deflecting device 7 and the imaging surfaces.

A direction where the light deflecting device 7 deflects (scans) the laser beams is called as a horizontal scanning direction. A direction, which crosses perpendicularly to the horizontal scanning direction and an axial line as a basis of a deflecting operation which is performed on the laser beams by the light deflecting device so that the laser beams scanned (deflected) by the light deflecting device direct to the horizontal scanning direction, is called as a vertical scanning direction.

Figure 4:
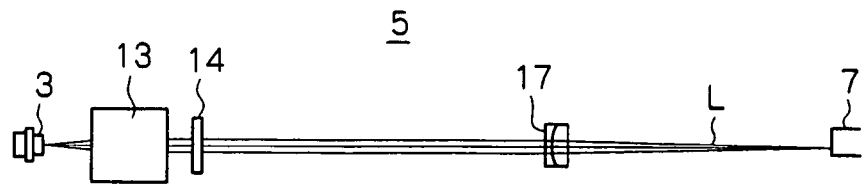
FIG. 4 is an explanatory diagram illustrating an arrangement of the components of the pre-deflection optical system in the optical multi-beam scanning device according to the first embodiment in which an optical path is a linear optical path.

As shown in FIGS. 3 and 4 (in FIG. 4, arbitrary laser beam L is shown as representative), the pre-deflection optical systems 5 have the light sources (Y, M, C and B) for respective color components composed of semiconductor laser elements, limitary focal lenses 13 (Y, M, C and B), diaphragms 14 (Y, M, C and B), and cylinder lenses 17 (Y, M, C and B), respectively. The limitary focal lenses 13 give predetermined focusing properties to the laser beams emitted from the light sources 3 (Y, M, C and B). The diaphragms 14 (Y, M, C and B) give an arbitrary sectional beam shape to the laser beams L which pass through the limitary focal lenses 13 (Y, M, C and B). The cylinder lenses 17 further give a predetermined focusing property to the laser beams L passing through the diaphragms 14 (Y, M, C and B) in the vertical scanning direction. The pre-deflection optical systems 5 shape the sectional beam shapes of the laser beams emitted from the light sources 3 (Y, M, C and B) into a predetermined shape so as to guide the laser beams to the reflecting surface of the light deflecting device 7.

After an optical path of the laser beam LC of cyan emitted from the cylinder lens 17C is folded by a folding mirror 15C, the laser beam LC transmits an optical path synthesizing optical part 19 so as to be guided to the reflecting surface of the light deflecting device 7. After an optical path of the laser beam LB of black emitted from the cylinder lens 17B is folded by a folding mirror 15B, the laser beam LB is reflected by the optical path synthesizing optical part 19 so as to be guided to the reflecting surface of the light deflecting device 7. After an optical path of the laser beam LY of yellow emitted form the cylinder lens 17Y passes through an upper portion of the folding mirror 15C, the laser beam LY transmits the optical path synthesizing optical part 19 so as to be guided to the reflecting surface of the light deflecting device 7. After an optical path of the laser beam LM of magenta emitted from the cylinder lens 17M is folded by a folding mirror 15M and the laser beam LM passes through an upper portion of the folding mirror 15B, the laser beam LM is reflected by the optical path synthesizing optical part 19 so as to be guided to the reflecting surface of the light deflecting device 7. In FIG. 4, the folding mirrors 15Y, 15B and 15C and the optical path synthesizing part 19 are omitted.

Figure 5A:
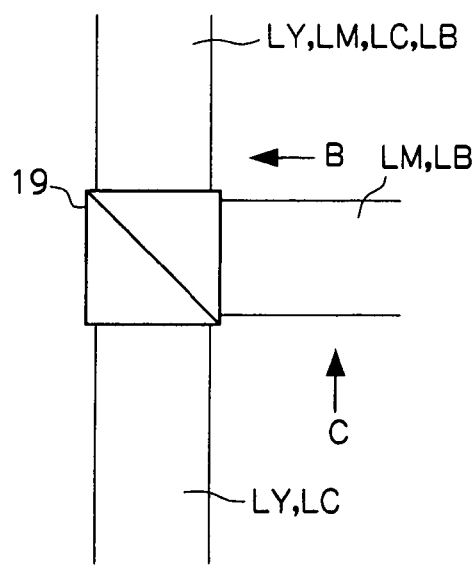
FIGS. 5A to 5C are diagrams explaining incident light and emitted light to an optical path synthesizing optical part in the optical multi-beam scanning device according to the first embodiment.
Figure 5B:
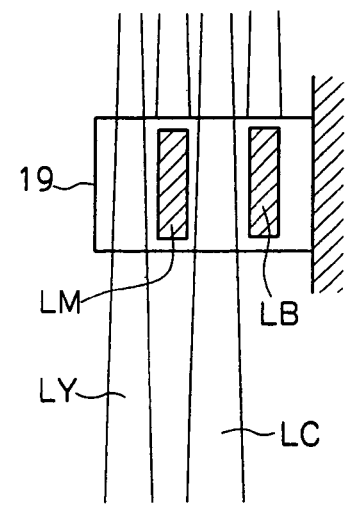
Figure 5C:
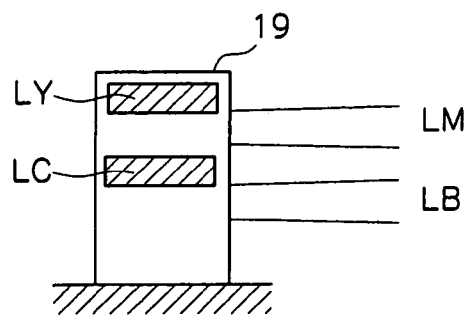

FIGS. 5A to 5C are diagrams explaining incident light and emitted light with respect to the optical path synthesizing optical part 19. FIG. 5A is a plan view, FIG. 5B is a diagram (right side view) in which the optical path synthesizing optical part 19 is viewed from a direction of an arrow B in FIG. 5A, and FIG. 5C is a diagram (front view) in which the optical path synthesizing optical part 19 is viewed from a direction of an arrow C in FIG. 5A.

Heights of positions where the laser beams enter the optical path synthesizing optical part 19 become higher in an order of the laser beam LB of black reflected by the optical path synthesizing optical part 19, the laser beam LC of cyan transmitting the optical path synthesizing optical part 19, the laser beam LM of magenta reflected by the optical path synthesizing optical part 19, and the laser beam LY of yellow transmitting the optical path synthesizing optical part 19.

An excessive light processing member 20, mentioned later, which characterizes the first embodiment is provided in a vicinity of the optical path synthesizing optical part 19.

The light deflecting device 7 has a polygon mirror 7a whose, for example, eight-plane reflecting surfaces (plane reflecting mirror) are arranged into a regular polygon shape and a motor 7b for rotating the polygon mirror 7a at a predetermined speed to the horizontal scanning direction.

The post-deflection optical system 9 has a pair of imaging lenses 21 (21a and 21b), a horizontal synchronization optical sensor 23, a horizontal synchronization folding mirror 25, an optical path correcting element 27, a plurality of mirrors 33Y, 35Y and 37Y (Yellow), 33M, 35M and 37M (magenta), 33C, 35C, 37C (Cyan), and 33B (black), and the like. The pair of imaging lenses 21 optimize shapes and positions of the laser beams L (Y, M, C and B) deflected (scanned) by the polygon mirror 7a on the imaging surfaces. The horizontal synchronization optical sensor 23 detects the laser beams L in order to conform the horizontal synchronization of the laser beams L (Y, M, C and B) passing through the pair of imaging lenses 21. The horizontal synchronization folding mirror 25 folds the laser beams L towards the horizontal synchronization optical sensor 23. The optical path correcting element 27 is arranged between the folding mirror 25 and the horizontal synchronization optical detector 23, and makes the laser beams L (Y, M, C and B) for the respective color components reflected towards the horizontal synchronization optical detector 23 by the folding mirror 25 roughly match with the incident position on the detecting surface of the horizontal synchronization optical detector 23. The mirrors 33Y, 35Y, 37Y, 33M, 35M, 37M, 33C, 35C, 37C and 33B guide the laser beams L (Y, M, C and B) for the respective color components emitted from the pair of imaging lenses 21 to the corresponding photosensitive drums 58 (Y, M, C and B), respectively.

Figure 6:
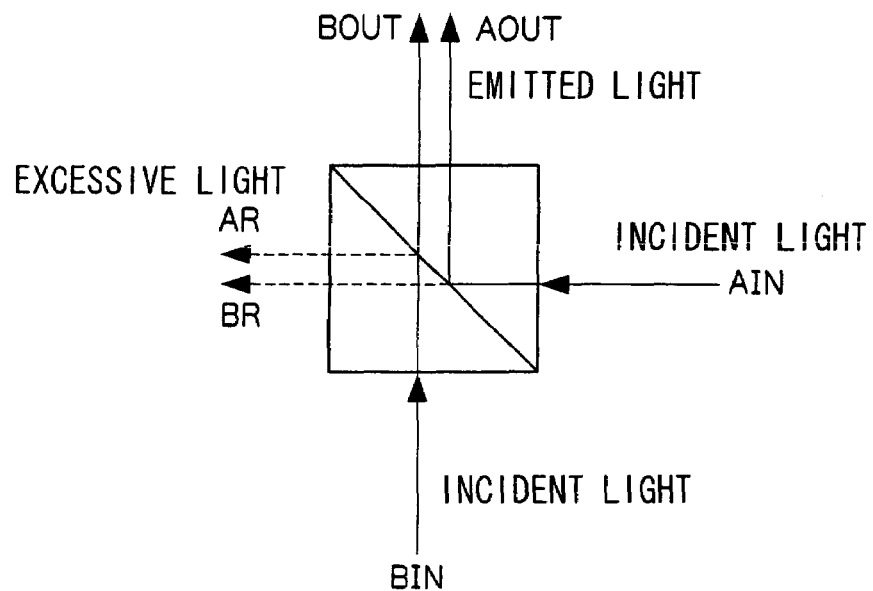
FIG. 6 is a diagram explaining excessive light from the optical path synthesizing optical part.

A beam splitter or a half mirror is adopted as the optical path synthesizing optical part 19, but when any one of them is used, as shown in FIG. 6, excessive light is generated. That is to say, incident light AIN (magenta and black) is reflected by the optical path synthesizing optical part (for example, beam splitter) 19 so as to be emitted light AOUT, and a part of the incident light AIN transmits the optical path synthesizing optical part 19 so as to become excessive light AR. Incident light BIN (yellow and cyan) transmits the optical path synthesizing optical part 19 so as to become emitted light BOUT, and a part of the incident light BIN is reflected by the optical path synthesizing optical part 19 so as to become excessive light BR. Both the excessive light AR and BR is emitted from one same surface of the optical path synthesizing optical part 19.

The excessive light from the optical path synthesizing optical part 19 becomes stray light, and this exerts a bad effect on the light sources and the other optical parts. In order to prevent this situation, the excessive light processing member 20 is provided in a vicinity of the excessive light emitting surface of optical path synthesizing optical part 19.

Figure 7:
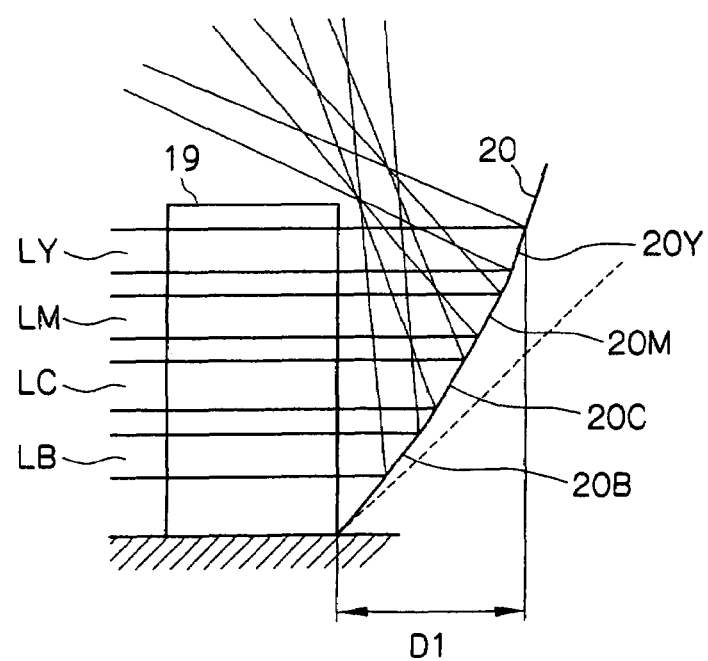
FIG. 7 is a schematic sectional view illustrating an excessive light processing member according to the first embodiment in a vertical scanning direction.

FIG. 7 is a schematic sectional view of the excessive light processing member 20 according to the first embodiment in the vertical scanning direction. In FIG. 7, also the laser beams for color components reflected in the optical path synthesizing optical part 19 go straight in order to simplify the explanation.

The excessive light processing member 20 according to the first embodiment is provided on a rear side of a surface other than the incident surface and the emitting surface of the optical path synthesizing optical part (beam splitter) 19 (excessive light emitted surface). It is composed of a reflecting wall having a multi-stage taper structure where four taper surfaces 20Y, 20M, 20C and 20B with different angles are combined.

The taper surface 20B for processing the excessive light (black) whose emitted position on the optical path synthesizing optical part 19 is the lowest in the vertical scanning direction is set in a position which is the closest to the optical path synthesizing optical part 19. Further, its tilt angle is set so as to be the smallest. The taper surface 20C for processing the excessive light (cyan) whose emitted position on the optical path synthesizing optical part 19 is the second lowest in the vertical scanning direction is set in a position which is the second closest to the optical path synthesizing optical part 19. Further, its tilt angle is set so as to be the second smallest. The taper surface 20M for processing the excessive light (magenta) whose emitting position on the optical path synthesizing optical part 19 is the second highest is set in a position which is the second farthest from the optical path synthesizing optical part 19. Further, its tilt angle is set so as to be the second largest. The taper surface 20Y for processing the excessive light (yellow) whose emitting position on the optical path synthesizing optical part 19 is the highest in the vertical scanning direction is set in a position which is the farthest from the optical path synthesizing optical part 19. Further, its tilt angle is set so as to be the largest.

As shown in FIG. 7, the tilt angles of the processing taper surfaces 20Y, 20M, 20C and 20B are set so that reflected return light from the taper surfaces passes through a position above the optical path synthesizing optical part 19 without crossing it.

A broken line shown in FIG. 7 is drawn in order to compare a taper surface of 45° with the excessive light processing member 20 according to the embodiment. Even the tilt angle of the taper surface 20B of the excessive light processing member 20 with the smallest angle becomes larger than 45°, and a necessary thickness of the excessive light processing member 20 (a necessary length viewed from a direction where the excessive light travels) is thinner than that of the taper surface of 45°.

According to the optical multi-beam scanning device and the image forming apparatus of the first embodiment, even when a sufficient space is not provided to the rear position on the excessive light emitting surface of the optical path synthesizing optical part for guiding a plurality of light beams to one deflecting surface, the light beams form the excessive light emitting surface is advanced to an unrelated direction by the taper surfaces including the taper surface with steep tilt angle. For this reason, this can prevent the excessive light from becoming stray light and exerting a bad effect on the light sources and the other optical parts.

Since the optical path synthesizing optical part has a multi-stage structure but simply has the taper surface, the taper shape functions as a drawing angle, and thus it can be formed by injection molding. As a result, the optical path synthesizing optical part can be provided directly on a housing or housing wall of the unit.

(B) Second Embodiment

The optical multi-beam scanning device according to a second embodiment of the present invention and the color image forming apparatus according to the second embodiment into which the optical multi-beam scanning device is incorporated have the approximately same constitutions as those in the first embodiment. The constitution of the excessive light processing member 20 provided in the vicinity of the optical path synthesizing optical part 19 is slightly different from that in the first embodiment.

Figure 8:
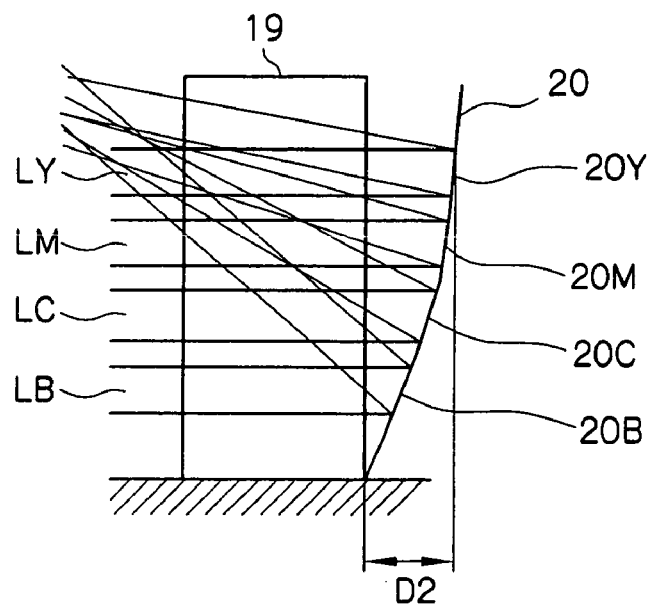
FIG. 8 is a schematic sectional view illustrating the excessive light processing member according to a second embodiment in the vertical scanning direction.

FIG. 8 is a schematic sectional view illustrating the excessive light processing member 20 according to the second embodiment in the vertical scanning direction, and it corresponds to FIG. 7 in the first embodiment.

In the first embodiment, the tilt angles of the processing taper surfaces 20Y, 20M, 20C and 20B of the excessive light processing member 20 are set so that the reflected return light from the taper surfaces does not cross the optical path synthesizing optical part 19 and passes through a position above it. In the second embodiment, however, the tilt angles of the processing taper surfaces 20Y, 20M, 20C and 20B of the excessive light processing member 20 are set so that the reflected return light from the taper surfaces passes through the optical path synthesizing optical part 19 but passes through the upper portion of the optical part by the side of the light sources from the optical path synthesizing optical part 19.

That is to say, in the second embodiment, the tilt angles of the processing taper surfaces 20Y, 20M, 20C and 20B are larger than those in the first embodiment. As a result, a necessary thickness of the excessive light processing member 20 (a necessary length viewed from the direction where the excessive light advances) D2 is thinner than the thickness D1 in the first embodiment.

According to the optical multi-beam scanning device and the image forming apparatus of the second embodiment, the similar effect to that in the first embodiment can be obtained. When the rear position on the excessive light emitting surface of the optical path synthesizing optical part hardly has a sufficient space, the second embodiment is more suitable than the first embodiment.

(C) Third Embodiment

In a third embodiment of the present invention, the constitution of the excessive light processing member 20 provided in the vicinity of the optical path synthesizing part 19 is different from those in the first and the second embodiments.

Figure 9:
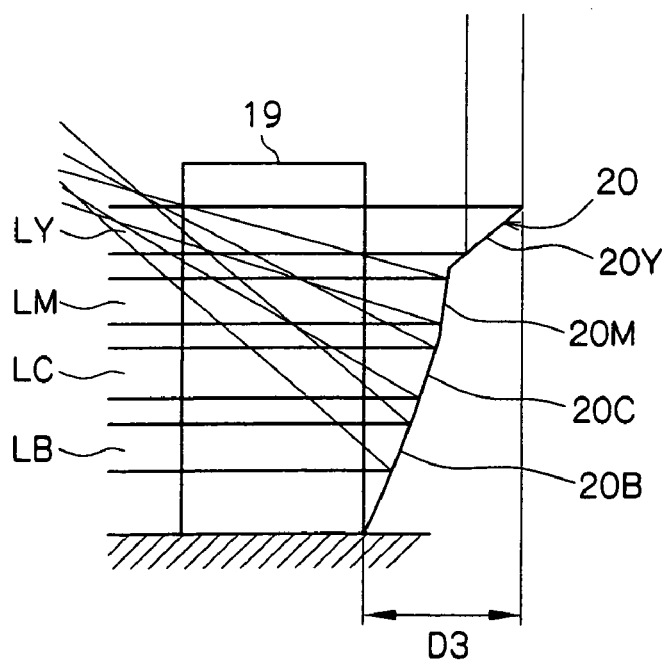
FIG. 9 is a schematic sectional view illustrating the excessive light processing member according to a third embodiment in the vertical scanning direction.

FIG. 9 is a schematic sectional view illustrating the excessive light processing member 20 according to the third embodiment in the vertical scanning direction, and corresponds to FIG. 7 in the first embodiment and FIG. 8 in the second embodiment.

The excessive light processing member 20 according to the third embodiment partially adopts the technical ideas in the first and the second embodiments. That is to say, in the excessive light processing member 20 according to the third embodiment, similarly to the first embodiment, the tilt angle of the taper surface 20Y for yellow is set so that the reflected return light of the incident excessive light is made to advance above the optical path synthesizing optical part 19 without crossing it. The tilt angles of the other taper surfaces 20M, 20C and 20B are, however, set so that the reflected return light from the taper surfaces passes through the optical path synthesizing optical part 19 but passes through the upper portion of the optical part by the side of the light sources from the optical path synthesizing optical part 19.

In the third embodiment, a necessary thickness D3 of the excessive light processing member 20 (a necessary length viewed from the direction where the excessive light advances) is smaller than the necessary thickness D1 in the third embodiment. The thickness D3 is larger than the necessary thickness D2 in the second embodiment.

Also according to the optical multi-beam scanning device and the image forming apparatus of the third embodiment, the similar effect to that in the first embodiment can be produced. The third embodiment is suitable for the case where the rear position on the excessive light emitting surface of the optical path synthesizing optical part has a space whose size is in the middle between the suitable spaces in the first and second embodiments.

(D) Fourth Embodiment

In a fourth embodiment of the present invention, the constitution of the excessive light processing member 20 provided in the vicinity of the optical path synthesizing optical part 19 is different from those in the above embodiments.

Figure 10A:
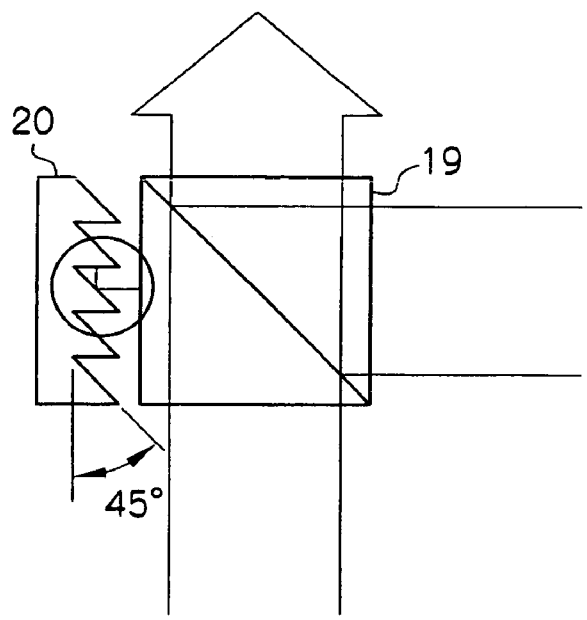
FIGS. 10A and 10B are schematic sectional views illustrating the excessive light processing member according to a fourth embodiment in a horizontal scanning direction.
Figure 10B:
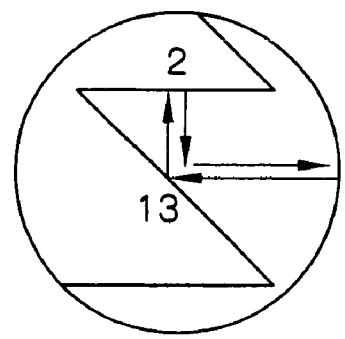

FIGS. 10A and 10B are schematic sectional views illustrating the excessive light processing member 20 according to the fourth embodiment in the horizontal scanning direction (correspond to the plan view of FIG. 6).

In the excessive light processing member 20 according to the fourth embodiment, a surface opposed to the excessive light emitting surface of the optical path synthesizing optical part 19 has a sawtooth shape in the cross section in the horizontal scanning direction. The sawtooth shape is composed by repetition of surfaces parallel with the advancing direction of the excessive light and surfaces tilted by 45° to the advancing direction of the excessive light. The excessive light from the optical path synthesizing optical part 19 is reflected three times in the excessive light processing member 20 of the fourth embodiment and is returned to the optical path synthesizing optical part 19 as shown in a partial enlarged diagram of FIG. 10B.

The excessive light itself from the optical path synthesizing optical part 19 has weak power, and is reflected by the excessive light processing member 20 three times so as to be returned to the optical path synthesizing optical part 19. For this reason, due to absorption with predetermined absorptance at every time of reflection, the return light to the optical path synthesizing optical part 19 has power which does not exert a bad effect on the light sources and the other optical parts.

Further, the excessive light processing member 20 has the cross section with the sawtooth shape but can be an approximately plate-shaped member, or can be formed as one surface of the housing so as to be capable of being provided very closely to the excessive light emitting surface of the optical path synthesizing optical part 19.

According to the optical multi-beam scanning device and the image forming apparatus of the fourth embodiment, even when the rear position on the excessive light emitting surface of the optical path synthesizing optical part for guiding a plurality of light beams to one deflecting surface does not have an enough space, the light beams from the excessive light emitting surface are multiply reflected by the excessive light processing member so as to be absorbed at every time of reflection. This can prevent the excessive light from becoming stray light and exerting a bad effect on the light sources and the other optical parts.

Figure 11A:
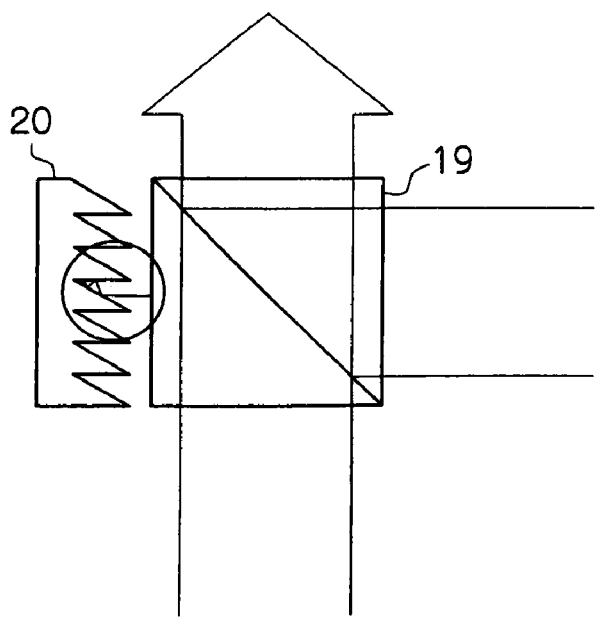
FIGS. 11A and 11B are schematic sectional views corresponding to FIGS. 10A and 10B illustrating a modified example of the fourth embodiment.
Figure 11B:
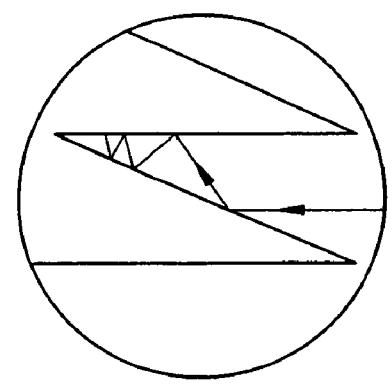

FIGS. 11A and 11B are diagrams illustrating a modified example of the fourth embodiment, and correspond to FIGS. 10A and 10B. In the excessive light processing member 20 shown in FIGS. 11A and 11B, the sawtooth shape has an acute angle so that a number of reflection times increases for the absorption of the excessive light.

The modified example of the fourth embodiment is such that the repeating direction of the sawtooth shape is not the directions shown in FIGS. 10A, 10B, 11A and 11B. For example, the direction may be the vertical scanning direction.

(E) Fifth Embodiment

In a fifth embodiment of the present invention, the constitution of the excessive light processing member 20 provided in the vicinity of the optical path synthesizing optical part 19 is different from those in the above embodiments.

FIG. 12 is a schematic sectional view illustrating the excessive light processing member 20 according to the fifth embodiment in the horizontal scanning direction.

The excessive light processing member 20 according to the fifth embodiment is structured as a plate-shaped member so as to have a surface opposed to the excessive light emitting surface of the optical path synthesizing optical part 19. In another manner, the excessive light processing member 20 is structured as one surface of the housing or the like, and a light absorbing sheet 20S is provided to the surface opposed to the excessive light emitting surface of the optical path synthesizing optical part 19.

Also according to the optical multi-beam scanning device and the image forming apparatus according to the fifth embodiment, the light absorbing sheet 20S absorbs the excessive light from the optical path synthesizing optical part. For this reason, the same effect as that in the fourth embodiment can be produced.

(F) Sixth Embodiment

In a sixth embodiment of the present invention, the constitution of the excessive light processing member 20 provided in the vicinity of the optical path synthesizing optical part 19 is different from those in the above embodiments.

FIG. 13 is a schematic sectional diagram illustrating the excessive light processing member 20 according to the sixth embodiment in the horizontal scanning direction.

The excessive light processing member 20 according to the sixth embodiment is structured as, for example, a plate-shaped member. A plurality of small local reflecting surfaces with a hemispherical shape (or a semicylindrical shape which extends only to a certain direction such as the vertical scanning direction) are arranged on the surface opposed to the excessive light emitting surface of the optical path synthesizing optical part 19, for example, in every direction (for example, the horizontal scanning direction and the vertical scanning direction). The excessive light is reflected from the local reflecting surfaces so as to be dispersed to various directions. As a result, the power of the reflected light per unit area becomes very weak.

The sixth embodiment, therefore, can prevent the excessive light from becoming stray light and exerting a bad effect on the light sources and the other optical parts.

Figure 14:
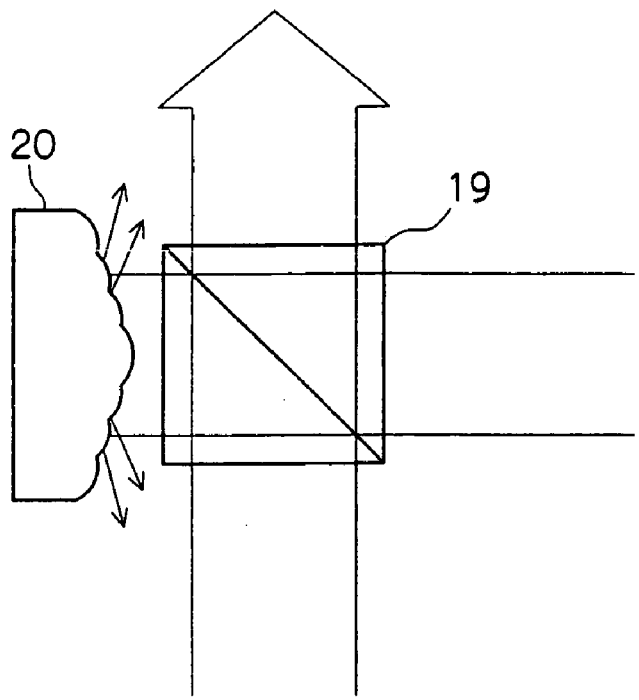
FIG. 14 is a schematic sectional view in the horizontal scanning direction illustrating a modified example of the sixth embodiment and corresponds to FIG. 13.

FIG. 14 is a diagram illustrating a modified example of the sixth embodiment, and corresponds to FIG. 13. The excessive light processing member 20 shown in FIG. 14 has a shape such that the entire surface including the small local reflecting surfaces with the hemispherical or semicylindrical shape is along a part of the spherical or cylindrical surface. This minimizes an amount of the dispersed light reflected from the local reflecting surfaces which returns to the excessive light emitting surface of the optical path synthesizing optical part 19.

(G) Seventh Embodiment

In a seventh embodiment of the present invention, the constitution of the excessive light processing member 20 provided in the vicinity of the optical path synthesizing optical part 19 is different from those in the above embodiments.

Figure 15:
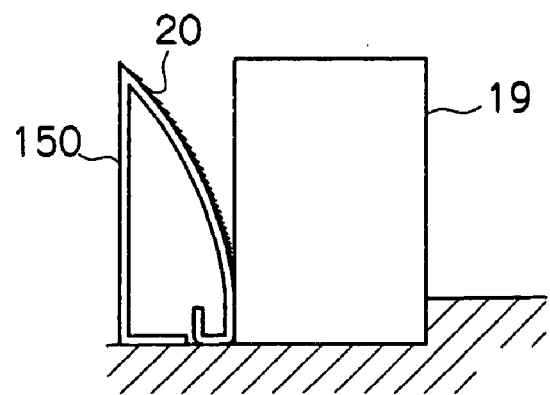
FIG. 15 is a schematic sectional view illustrating the excessive light processing member according to a seventh embodiment in the vertical scanning direction.

FIG. 15 is a schematic sectional view illustrating the excessive light processing member 20 according to the seventh embodiment in the vertical scanning direction.

The seventh embodiment can be applied to the case where the optical path synthesizing optical part 19 receives a pressing force of a plate spring member 150 so that its position is regulated by a stopper section 101, and the excessive light emitting surface of the optical path synthesizing optical part 19 receives the pressing force of the plate spring member 150. One surface of the plate spring member 150 opposed to the excessive light emitting surface of the optical path synthesizing optical part 19 has a function of the excessive light processing member 20 according to any one of the embodiments. In an example shown in FIG. 15, one surface of the plate spring member 150 has the function of the excessive light processing member 20 according to the fourth embodiment (specifically, the modified example of the fourth embodiment).

According to the seventh embodiment, new surface finishing or the like is necessary for the plate spring member 150, but the excessive light can be prevented from becoming stray light and exerting a bad effect on the light sources and the other optical parts without providing a new member.

(H) Another Embodiment

The above embodiments explain various modified examples, but a modified example explained below can be given.

The first to the third embodiments explain that the taper surfaces with different tilt angles whose number is the same as that of the four kinds of the laser beams are provided. The number of the taper surfaces with different angles is not, however, limited to a number of the laser beams as long as their combination can make the thickness of the excessive light processing member 20 thin. The number may be, therefore, two or more. Further, the excessive light processing member 20 may have a curved surface where the tilt angle continuously changes (for example, a surface having a parabola-shaped cross section). In this case, reflection (diffuse reflection) to an unintended direction in a fixed switching position of the tilt angle can be suppressed.

The first to the third embodiments explain that the reflected light from the excessive light processing member 20 directs to a position higher than the incident light viewed from the vertical scanning direction. The tilt angles of the taper surfaces may be selected so that the reflected light from the excessive light processing member 20 directs downward viewed from the vertical scanning direction. In another manner, positive and negative tilt angles are present so that the light are reflected upward viewed from the vertical scanning direction by a certain taper surface and reflected downward viewed form the vertical scanning direction by another taper surface.

The first to the third embodiments explain that the excessive light is allowed to go upward or downward with respect to the vertical scanning direction, but may be allowed to go to the horizontal scanning direction.

The fourth embodiment explains that the reflection at a plurality of times for absorption of the excessive light is executed by utilizing the sawtooth shape. The reflection at a plurality of times may be executed by utilizing another repeated shape such as a triangular wave shape.

The sixth embodiment explains that the dispersed reflection is executed by the repetition of the local reflecting surfaces with the hemispherical or semicylindrical shape. The dispersed reflection (diffuse reflection) may be executed by rough finishing of the surface and the like.

The above embodiments explain the optical multi-beam scanning device for allowing the four beams to enter one surface of the polygon mirror. The present invention can be, however, applied to optical multi-beam scanning devices for allowing a plurality of beams such as two beams, seven beams or eight beams enter one surface of the polygon mirror. That is to say, the present invention can be applied to optical multi-beam scanning devices having one ore more optical path synthesizing optical parts (beam splitter or half mirror) for synthesizing optical paths of beams. Further, the present invention is not limited to the color mode, and can be applied to optical multi-beam scanning devices for monochrome mode having one or more optical path synthesizing parts (beam splitter or half mirror) for synthesizing optical paths of beams.

The position of the pre-deflection optical system in the optical path synthesizing optical part is not limited to the position explained in the embodiments. A cylinder lens for giving a predetermined focusing property in the vertical scanning direction, for example, may be provided on a lower stream side of the optical path synthesizing optical part.

What is claimed is:

1. An optical multi-beam scanning device, comprising:
   a plurality of light sources;
   pre-deflection optical units for giving a predetermined property to light beams from the light sources, the pre-deflection optical units corresponding to the light sources, respectively;
   an optical path synthesizing member for aligning optical paths of the light beams from all or some of the light sources in a horizontal scanning direction after the pre-deflection optical units give the predetermined properties to the light beams or while giving them to the light beams;
   an excessive light processing member having a multi-stage taper constitution with a plurality of taper surfaces having different tilt angles for reflecting excessive light emitted from an excessive light emitting surface which is not an incident surface nor an emitting surface of the optical path synthesizing member; and
   a light deflecting device for deflecting the light beams from the pre-deflection optical units corresponding to the light sources to the horizontal scanning direction due to reflection from one surface,
   wherein the tilt angles of all the taper surfaces in the excessive light processing member are set so that reflected light from the taper surfaces reenter the excessive light emitting surface of the optical path synthesizing member, and the reentered light beams have predetermined angles for passing through an upper or lower portion of an optical part present in a direction where the light beams emitted from the optical path synthesizing member advances.

2. The optical multi-beam scanning device according to claim 1, wherein the excessive light processing member has the taper surfaces with different angles whose number is the same as that of the optical paths.

3. An optical multi-beam scanning device, comprising:
   a plurality of light sources;
   pre-deflection optical units for giving a predetermined property to light beams from the light sources, the pre-deflection optical units corresponding to the light sources, respectively;
   an optical path synthesizing member for aligning optical paths of the light beams from all or some of the light sources in a horizontal scanning direction after the pre-deflection optical units give the predetermined properties to the light beams or while giving them to the light beams;
   an excessive light processing member having a multi-stage taper constitution with a plurality of taper surfaces having different tilt angles for reflecting excessive light emitted from an excessive light emitting surface which is not an incident surface nor an emitting surface of the optical path synthesizing member; and
   a light deflecting device for deflecting the light beams from the pre-deflection optical units corresponding to the light sources to the horizontal scanning direction due to reflection from one surface,
   wherein the tilt angles of some taper surfaces in the excessive light processing member are set so that reflected light from the taper surfaces does not enter the excessive light emitting surface of the optical path synthesizing member, and the tilt angles of the other taper surfaces are set so that the reflected light form the taper surfaces reenters the excessive light emitting surface of the optical path synthesizing member and the reentered light beams have predetermined angles for passing through an upper or lower portion of an optical part present in a direction where the light beams emitted from the optical path synthesizing member advances.

4. The optical multi-beam scanning device according to claim 3, wherein the excessive light processing member has the taper surfaces with different angles whose number is the same as that of the optical paths.

* * * * *